May 5, 1925.
C. B. FIELDS
CALIPER
Filed July 14, 1921
1,536,576
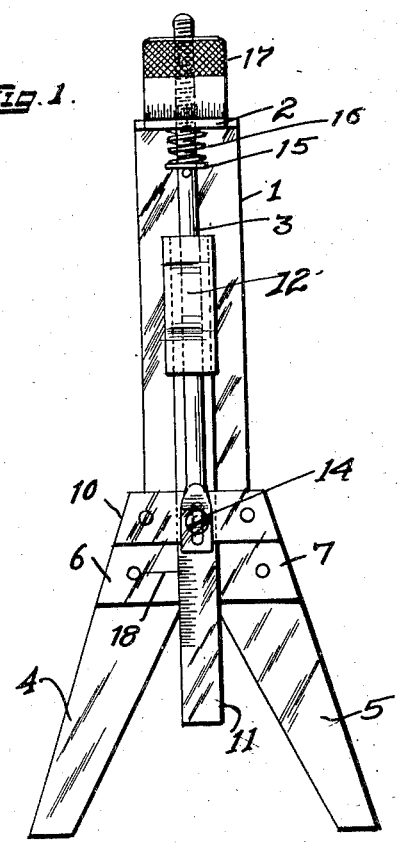
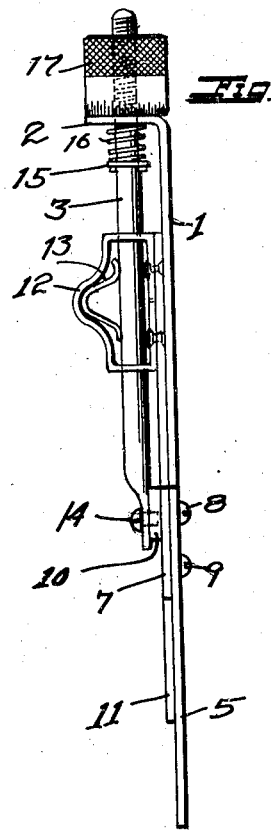
INVENTOR.
Carl B. Fields,
BY
Carlos P. Griffin
ATTORNEY.

Patented May 5, 1925.

1,536,576

UNITED STATES PATENT OFFICE.

CARL B. FIELDS, OF SAN FRANCISCO, CALIFORNIA.

CALIPER.

Application filed July 14, 1921. Serial No. 484,581.

*To all whom it may concern:*

Be it known that I, CARL B. FIELDS, a citizen of the United States, residing at San Francisco, in the county of San Francisco, State of California, have invented a new and useful Caliper, of which the following is a specification in such full and clear terms as will enable those skilled in the art to construct and use the same.

This invention relates to a caliper and its object is to produce a caliper which will enable a workman to quickly determine the size of a given rod he may be turning or operating upon without the necessity of the careful adjustment required with the ordinary form of micrometer and this caliper is an improvement on the caliper shown in my Patent No. 1,325,631, December 23, 1919.

A further object of the invention is to enable very close readings to be taken of different sized shafts or objects without the necessity of moving the micrometer gauge more than one turn to bring any given line of the feeler gauge into alignment with the line for determining the size of the given object.

Another object of the invention is to simplify the construction and to make a gauge which will be as small as is consistent with the work to be performed by it.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a plan view of the complete gauge, and

Fig. 2 is a side elevation of the complete gauge.

The gauge comprises a flat plate 1 having one end up-turned at 2 to receive the slidable rod 3. At the opposite end of the plate it is provided with two fingers 4 and 5. These fingers carry two plates 6 and 7 which are secured thereto by means of suitable screws as indicated at 8 and 9 and at one end of the small plates 6 and 7 there is a narrow plate 10 also connected to the plates 6 and 7.

The construction just outlined leaves an opening under the plate 10 and between the two plates 6 and 7 for a flat graduated slide 11. This slide has an operating handle 12 through which the rod 3 passes and which is held in engagement with said rod with considerable force by means of a spring 13. The object of the spring 13 is to prevent the slide 12 from being easily dislocated from any given position on the rod 3. However, when it is desired to move it it may be easily pushed back by the object itself or by the thumb if it is to be pushed forwardly.

The rod 3 has one end flattened and is provided with a slot through which the screw 14 extends. At the other end the rod has a washer 15 secured thereto and a stiff spring 16 placed between the washer 15 and the up-turned end 2 of the base 1. A knurled nut 17 is secured on the end of the rod 3 and the graduations thereon enable the operator to read a length equivalent to the space between one of the divisions of the scale on the blade 11, divided by the number of divisions on the knurled nut 17, the threads of the knurled nut being of such pitch as to shift the blade 11, one division of its scale with each turn of the knurled nut 17.

The top of the up-turned portion 2 of the plate 1 is provided with one mark with which the scale marks on the knurled nut are brought into alignment when smaller graduations than those shown on the slide 11 are to be read.

In operation the workman pushes the slide 12 outwardly with his thumb and then presses the gauge into alignment with the object to be measured. At this time the knurled nut 17 is set at zero for convenience in reading the amount; it may later have to be shifted to act as a vernier in reading the length the line 18 may be away from one of the graduations on the blade 11. The result of this will be that the slide 11 will be pushed back and the workman can read the size of the object by examining the scale graduations on the slide 11, but inasmuch as the lines on the scale of the slide 11 will seldom coincide with the line 18 the workman will ascertain the difference in thousands, the scale on the slide 11 usually being divided in fortieth parts, and the scale on the knurled nut is usually divided in twenty-fifth parts, by rotating the nut 17 to bring the line of the scale on the slide 11 which is immediately below line 18 into alignment with the said line 18. Inasmuch as the knurled nut 17 is usually set at zero this will at once give the number of whole divisions shown on the scale on the slide 11 plus the thousands read on the nut 17.

The spring 16 always holds the knurled nut 17 closely in engagement with the upturned portion 2 so that it is particularly easy to read that scale in conjunction with the line on the upturned plate 2. It will of course be apparent that the distance apart of the marks on the slide 11 will be determined by the size of the angle between the arms 4 and 5 but this angle is ordinarily made such that the scale used can be divided to read fortieths of an inch directly on the blade 11 and then by dividing the knurled nut 17 into twenty-fifths, thousandths can be easily read.

What I claim is as follows, but various modifications may be made in the construction shown in the drawings and above particularly described form, within the purview of my invention:

1. In a caliper, a plate, a pair of diverging arms carried thereby, at one end thereof, a slide projectable between the arms and carrying a series of graduations, a longitudinally slidable rod carried by the plate, means frictionally connecting said slide and rod for movement in unison, a micrometer nut having a series of graduations on its periphery and threaded on said rod, and a spring holding said nut in contact with an upturned portion of said plate there being reading lines on said plate cooperating with the graduations on said slide and nut respectively whereby the size of circular objects may be ascertained.

2. In a caliper, a plate having a pair of diverging arms, a slide projectable between the arms and carrying a series of graduations, a longitudinally slidable rod carried by the plate, means to frictionally connect said slide and rod, a graduated micrometer nut for operating said rod, and a spring holding said nut in contact with an upturned portion of said plate there being reading lines on said plate cooperating with the graduations on said slide and nut respectively whereby the size of circular objects may be ascertained by moving the slide.

3. In a caliper, a plate having a pair of diverging arms at one end, a slide projectable between the arms and carrying a series of graduations, a threaded rod, means mounting said rod for longitudinal movement along an axis coplanar with the axis of movement of said slide, spring means frictionally connecting said slide and rod, a graduated micrometer nut threaded on said rod for moving the rod and slide and a spring on said rod urging said nut into contact with an upturned portion of said plate, there being reading lines on said plate cooperating with the graduations on said slide and nut respectively whereby the size of circular objects may be ascertained by moving the slide.

In testimony whereof I have hereunto set my hand this 30th day of June, A. D. 1921.

C. B. FIELDS.

Witness:
A. G. BRUCE.